United States Patent [19]
Gabelich

[11] Patent Number: 5,394,749
[45] Date of Patent: Mar. 7, 1995

[54] METHOD AND APPARATUS FOR DETECTING THE POSITION OF FLUID-FLUID INTERFACES

[75] Inventor: Stephen A. Gabelich, Long Beach, Calif.

[73] Assignee: Hughes Aircraft Company, Los Angeles, Calif.

[21] Appl. No.: 257,229

[22] Filed: Jun. 9, 1994

Related U.S. Application Data

[63] Continuation-in-part of Ser. No. 22,213, Feb. 25, 1993, abandoned.

[51] Int. Cl.$^6$ ............................................. G01F 23/22
[52] U.S. Cl. ........................... 73/295; 204/70; 204/67
[58] Field of Search .............. 73/295; 374/54; 204/67, 204/70

[56] References Cited

U.S. PATENT DOCUMENTS

| | | | |
|---|---|---|---|
| 3,279,252 | 10/1966 | Barlow | 73/295 |
| 3,360,990 | 1/1968 | Greene et al. | 73/295 |
| 3,905,243 | 9/1975 | Goldfuss | 73/295 |
| 3,995,490 | 12/1976 | Canalini et al. | 73/295 |
| 4,440,717 | 4/1984 | Bevilacqua et al. | 73/295 |
| 4,592,230 | 6/1986 | Waring et al. | 73/295 |
| 4,785,665 | 11/1988 | McCulloch | 73/295 |
| 4,804,460 | 2/1989 | Moys et al. | 73/295 |
| 4,915,508 | 4/1990 | McCulloch et al. | 73/295 |
| 5,044,764 | 9/1991 | Aoki et al. | 73/295 |
| 5,234,527 | 8/1993 | Nozawa et al. | 73/295 |

FOREIGN PATENT DOCUMENTS

| | | | |
|---|---|---|---|
| 0074491 | 3/1983 | European Pat. Off. | |
| 2275756 | 1/1976 | France | |
| 2447877 | 8/1980 | France | |
| 3822705 | 1/1990 | Germany | |
| 0158522 | 9/1982 | Japan | 73/295 |
| 404232423 | 8/1992 | Japan | 73/295 |
| 2134260 | 8/1984 | United Kingdom | 73/295 |
| 0492750 | 3/1976 | U.S.S.R. | 73/295 |
| 1719912 | 3/1992 | U.S.S.R. | 73/295 |

OTHER PUBLICATIONS

"Electrolytic Removal of Magnesium from Scrap Aluminum" *Journal of Metals,* vol. 36, No. 7, Jul., 1984 pp. 141–143.

"Electrolytic Demagging of Secondary Aluminum in a Prototype Furnace" *AFS Transactions,* vol. 94, pp. 385–390 (1986).

K. Termatt et al., "Fabrication Tests of Tricoth–Type Reactor Water Level Sensor," IEEE Transactions on Nuclear Science, vol. 37, No. 2, Apr. 1990, pp. 1024–1031.

Patent Abstracts of Japan, vol. 10, No. 76 (P–440) (2133), 26 Mar. 1986 (Abstract only).

*Primary Examiner*—Diego F. F. Gutierrez
*Attorney, Agent, or Firm*—M. E. Lachman; M. W. Sales; W. K. Denson-Low

[57] ABSTRACT

Precise information is obtainable concerning the position of a fluid-fluid interface (28, 33), such as between a gas and a liquid or between liquids. Such information is important for the control and automation of molten metal refining processes. Specifically, in an electrolytic process for removing magnesium from molten aluminum, knowledge of the vertical position of an interface (33) between the electrolyte and the magnesium and an interface (28) between the electrolyte and the aluminum facilitates the automatic removal of the purified metals when drained or drawn from the furnace. Heat energy is conducted through a thermocouple-heater assembly 34 to a thermocouple (38) located at its tip (36). The equilibrium temperature at the thermocouple junction is dependent upon the heat loss through tip (36). When the tip comes in contact with a fluid of different thermal conductivity, as between molten matter (29) and electrolyte (30), the equilibrium temperature at tip (36) and, thus, of the thermocouple junction will change. This change in temperature is used to determine the level of the liquid-liquid interface between molten matter (29) and electrolyte (30). This information is used to determine when the drawing of further molten material from the furnace is to be terminated, so that aluminum purified in the refining process and previously drawn through an outlet (26) will not be contaminated.

9 Claims, 5 Drawing Sheets

METHOD AND APPARATUS FOR DETECTING THE POSITION OF FLUID-FLUID INTERFACES

This is continuation-in-part of application Ser. No. 08/022,213, filed Feb. 25, 1993, now abandoned.

BACKGROUND OF THE INVENTION

1. Field of the Invention

The present invention relates to a method and apparatus for detecting the position of fluid-fluid interfaces, e.g., between liquid-liquid and gas-liquid interfaces, and, more particularly, to the effecting of such a method and apparatus by use of thermal detection means. The present invention is suitable for use in the refining of molten metals with specific application to the removal of magnesium from scrap aluminum.

2. Description of Related Art and Other Considerations

Although the impetus for conceiving the present invention is to provide process control in molten metal technologies, specifically, in a process for refining scrap aluminum, it is to be understood that the present invention is as applicable to any need for detecting the position of fluid-fluid interfaces by thermal detection means.

The removal of magnesium from scrap aluminum has been discussed in several publications, of which the following two are of particular interest to the present invention, viz., "Electrolytic Removal of Magnesium from Scrap Aluminum" *JOURNAL OF METALS*, Vol. 36, No.7, July 1984 pp 141–43, and "Electrolytic Demagging of Secondary Aluminum in a Prototype Furnace" AFS Transactions, Vol. 94, pp. 385–390 (1986). The following excerpt from the latter article well states the reasons and background for recovering aluminum from scrap.

"The amount of aluminum in an automobile has steadily increased from an average of 40 kg in 1976 to an average of 60 kg in 1982 due to efforts to achieve higher fuel efficiency by lowering the overall weight of the vehicle. Therefore, for a constant supply of aluminum at minimum cost, casting producers may consider increasing the use of high magnesium scrap, with large potential savings over the purchase of primary aluminum. However, to conform with specifications, the production of casting alloys such as 319 from high magnesium aluminum scrap would require the removal of magnesium in excess of 0.1 wt. %. A chlorination process is most widely used by secondary smelters for demagging casting alloys. In this process, magnesium is selectively oxidized by chlorine and removed from molten aluminum in the form of a magnesium chloride dross. While the process is reasonably efficient at high magnesium content, it may create unacceptable environmental conditions in the plant. In addition, magnesium is being lost in the form of $MgCl_2$ dross, which being hygroscopic may pose disposal problems.

"Recognizing the need for an efficient and pollution-free demagging process, we have been developing the electrochemical process described in this paper. This process recovers magnesium in the form of salt-coated globules and apparently causes no environmental problems. The process . . . consists of covering the molten aluminum scrap with an electrolyte (a mixture of alkali and alkaline earth metal halides) and passing a current between molten aluminum acting as an anode and inert cathode dipped into the electrolyte. On applying a voltage between the electrodes, magnesium (being more reactive) dissolves first in the electrolyte from the aluminum melt, and concurrently deposits on the cathode. Because of its lower density, magnesium floats on the electrolyte and, thus, it is separated from the aluminum."

Inasmuch as the reaction vessel utilized in this demagging process contains three liquid layers comprising a top layer of magnesium, a middle layer of salt-electrolyte and a bottom layer of aluminum, operators need to monitor the levels of each layer during the addition or removal of metal. In particular, precise information about the electrolyte-metal interfaces is required to permit the removal of purified aluminum from the vessel without its being contaminated with the molten salt.

In the equipment described in the above-referenced *AFS Transactions* publication, the problem of aluminum removal was solved by utilizing two vertically placed drain holes, similar to holes 25 and 26 herein shown in FIG. 1. As the purified aluminum was drained from the reaction furnace into separate collection vessels, the electrolyte appeared at the upper drain hole, at which point the draining process was stopped to prevent any electrolyte from draining through the lower hole. The procedure was inconvenient to use and would be difficult to automate.

SUMMARY OF THE INVENTION

The present invention successfully provides the necessary process control information in an easier and more dependable manner. The position of an interface between fluids, for example, between gaseous and liquid media, or between two liquid media, such as between the molten aluminum and the electrolyte, which respectively have different heat transfer characteristics, is detected by sensing a change in the conductivity of heat within the respective interfacing fluids. The term "heat transfer characteristics" is intended to encompass, but not be limited to, such characteristics as coefficient of thermal conductivity, kinematic viscosity, prandtl number and thermal convection.

Specifically, the method and apparatus embodying the method exploit differences in heat transfer characteristics, such as thermal conductivity, in adjacent fluid or liquid layers. Preferably, a source of heat for heating a probe causes heat to flow into the fluids, whether liquid or gas. By measuring the steady state temperature of the heated probe, the precise level of the interfacing liquid layers can be determined, in particular through the rate of flow of heat energy detected by some form of temperature sensing, such as a thermocouple, located in the tip of the sensing device. The equilibrium temperature at the thermocouple junction is dependent upon the heat loss through its tip. When the tip comes in contact with a gas or a liquid of different thermal conductivity, the equilibrium temperature at the thermocouple junction changes, and this change is used to denote the location of the interface.

Several advantages are derived from the present invention. Precise measurements of fluid-fluid interfaces are obtainable, particularly without requiring the use of electrical field or like measuring means, to preclude any such field from interfering with the sensing. Level sensing can be implemented in corrosive or other hostile environments. In a demagging process, removal of the purified aluminum and magnesium can be easily automated.

Other aims and advantages, as well as a more complete understanding of the present invention, will appear from the following explanation of exemplary embodiments and the accompanying drawings thereof.

DETAILED DESCRIPTION OF THE PREFERRED EMBODIMENTS

Figure 1:
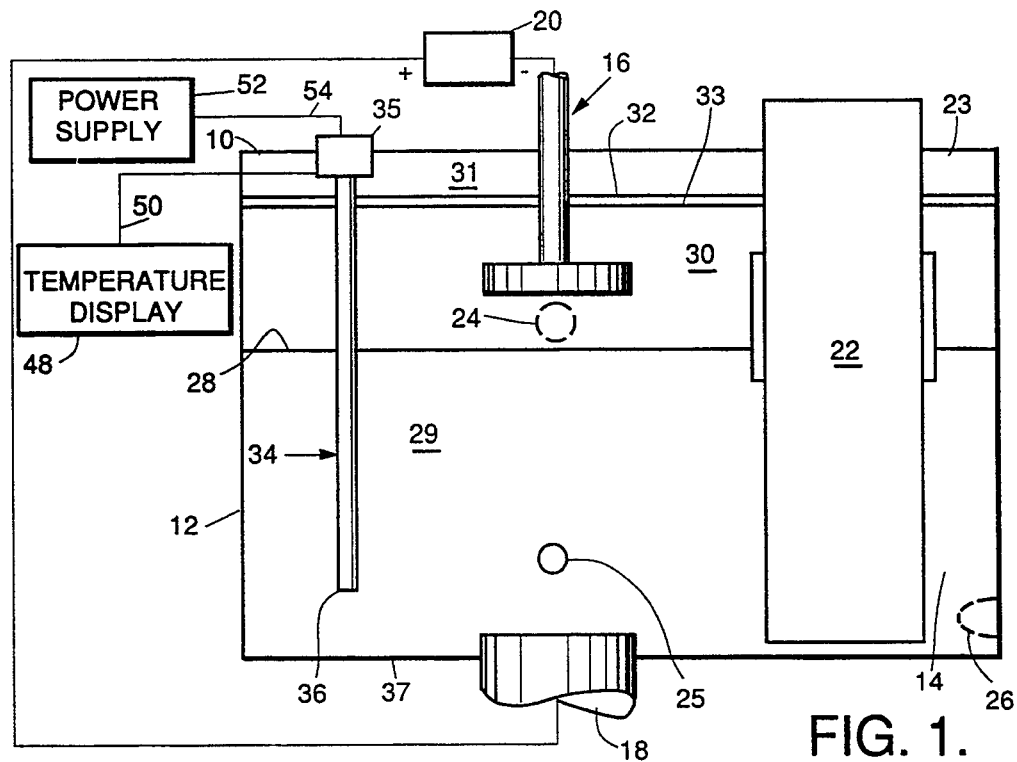
FIG. 1 is view of apparatus utilized to electrochemically purify scrap aluminum by extracting magnesium from the scrap and, by use of the present invention, to detect liquid-liquid interfaces between an electrolyte and the molten aluminum and magnesium extracted from the scrap.
Figure 2:
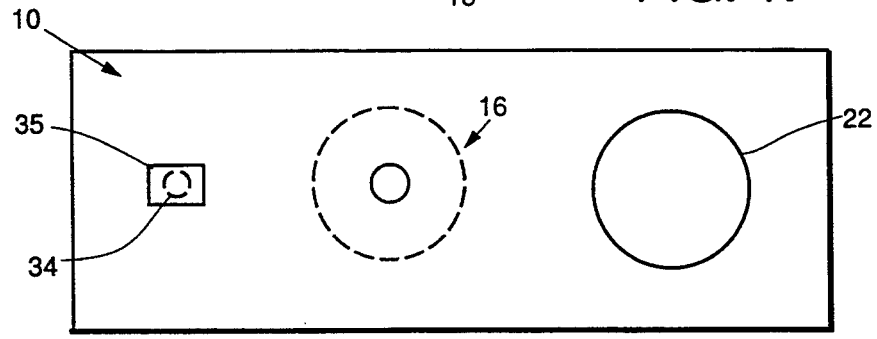
FIG. 2 is a top view of FIG. 1.

As shown in FIGS. 1 and 2, a fully sealed furnace or reaction vessel 10 provides a closed environment for the removal of magnesium from scrap aluminum and for enabling purified aluminum to be drawn from closed vessel 10. The working volume of furnace 10 is divided into a refining zone 12 and a heating/pouring zone 14. Positioned in refining zone 12 is a cathode 16 positioned above an anode 18. The cathode and anode are connected to a source of direct current 20. Preferably, cathode 16 is formed of mild steel, while anode 18 is formed of graphite. A heater 22 is positioned in heating/pouring zone 14. A cover 23 in the otherwise closed top Of vessel 10 is opened so that scrap aluminum in molten form may be placed into the furnace. Various holes 24, 25 and 26 are provided in furnace 10 and are closable by suitable means. Hole 24 is used as an electrolyte/separated magnesium drain, while holes 25 and 26 are used as egresses for removal of refined aluminum from the furnace. As will be discussed below, hole 25 may be dispensed with, as being useful in practicing the demagging process prior to implementation of the present invention.

In the operation of the process both prior to and after use of the present invention, and as more fully detailed in the two publications referred to above, scrap aluminum containing magnesium impurities in molten form is placed into heating/pouring zone 14 through the opening uncovered by cover 23, and thus within refining zone 12 to approximately the lowermost portion of hole 24, as designated generally by a level symbolized by line 28. Indicium 29 generally designates molten matter comprising either the molten scrap aluminum prior to purification or the purified aluminum obtained therefrom. An electrolyte 30 of calcium chloride, magnesium chloride, potassium chloride and sodium chloride is placed above the molten scrap aluminum to a depth sufficient at least partially to cover cathode 16. A space 31 is provided for an inert gas, for example, argon. Upon application of electrical energy, the magnesium is ionized and collected at the cathode, thereby forming a layer 32 of molten magnesium. After a suitable period of time, when the molten scrap aluminum is sufficiently purified of the magnesium impurities, one or both tap holes 25 and 26 are opened in order to draw off the purified aluminum.

Before use of the present invention and as discussed above, as the level of purified aluminum drops and the level of the electrolyte with impurities therein reaches tap hole 25, no further aluminum is drawn from furnace 10. Because tap hole 26 is positioned lower than tap hole 25, it is possible to separate the amount of pure aluminum drawn from the furnace at tap hole 26 as distinguished from tap hole 25. Therefore, in the process thus described, it has been possible to monitor the level which distinguished the interface between the pure and impure molten materials.

In the present invention, however, rather than utilizing a pair of tap holes 25 and 26 to determine the level at which impurities are discernable, the following thermal sensing system is employed.

While the preferred heat sensor of the present invention comprises a thermocouple, it is to be understood that any form of heat sensing apparatus is as applicable. Furthermore, the mechanism of heat transfer from or to the molten materials is generically referred to herein as heat transfer characteristics, which is intended to encompass such parameters as coefficient of thermal conductivity, kinematic viscosity, prandtl number and thermal convection. Therefore, these specific terms are intended to be taken as illustrative and not limiting of the present invention, even though specific use may be employed in the subsequent description.

Accordingly, a thermocouple-heater assembly 34, having a head 35 and a tip 36, is positioned within furnace 10 and is extended downwardly towards bottom 37 of the furnace. Depending upon the stage at which the process is being conducted, assembly 34 is positioned within refining zone 12 in molten matter 29, and its tip 36 is placed generally at a level where tap hole 25 would have been located, if retained. Accordingly, assembly 34 terminates at a level which is slightly higher than that of tap hole 26. The thermocouple-heater assembly extends upwardly to and exits at the top of furnace 10 in head 35.

Figure 3:
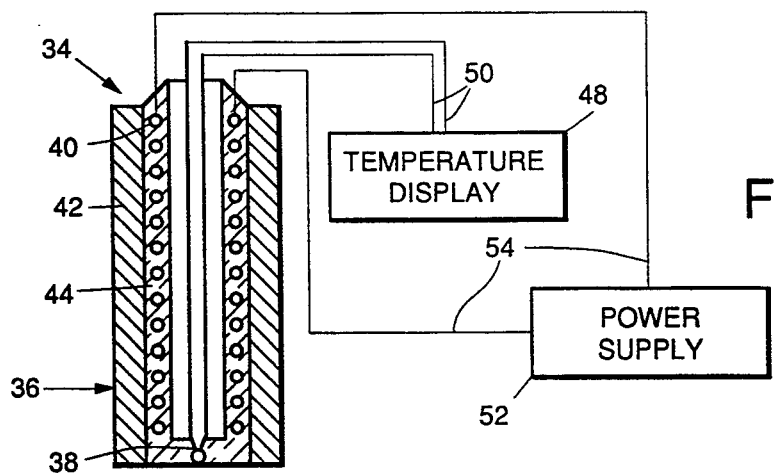
FIG. 3 is a view in cross-section showing in enlargement the temperature sensing thermocouple and heating coil illustrated in FIG. 1.

As best illustrated in FIG. 3, thermocouple-heater assembly 34 includes a thermocouple 38 which is coaxially centered within a heater coil 40, for example, of nichrome wire. The thermocouple and heater coil are positioned within a tube 42 of alumina or other high temperature material which is sufficient to withstand the temperatures of molten materials 29 and 30 and which is non-electrically conducting. Thermocouple 38 and heater coil 40 are secured in the alumina tube by a ceramic cement 44. In this embodiment, only the thermocouple junction and not its leads is secured in the ceramic cement. A temperature display 48 is electrically coupled to thermocouple 38 by electrical wires 50.

Heater coil 40 is energized by a power supply 52 through electrical wires 54.

Figure 4:
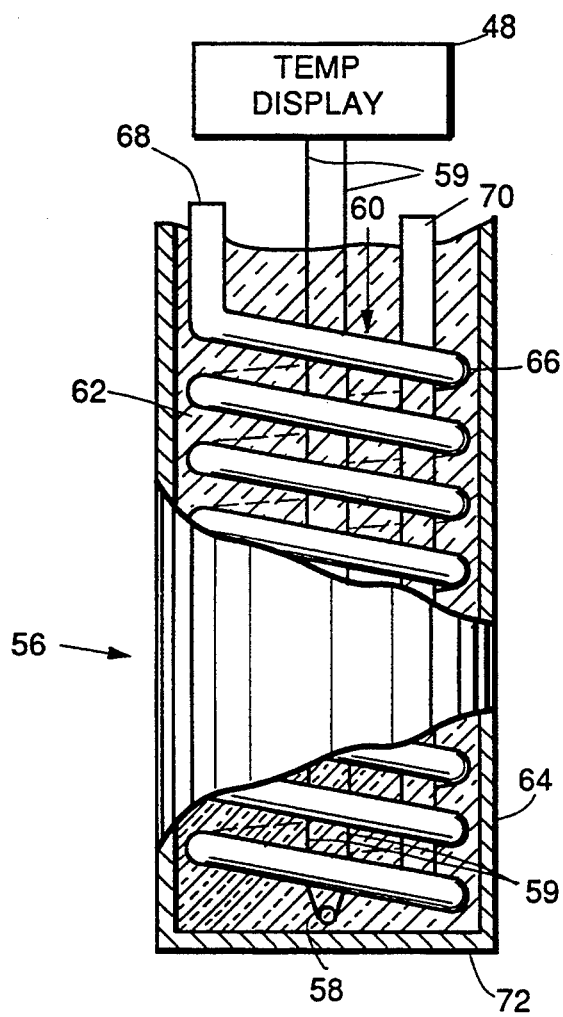
FIG. 4 and its end cross-section in FIG. 5 are views of an alternate arrangement that is depicted in FIG. 3.
Figure 5:
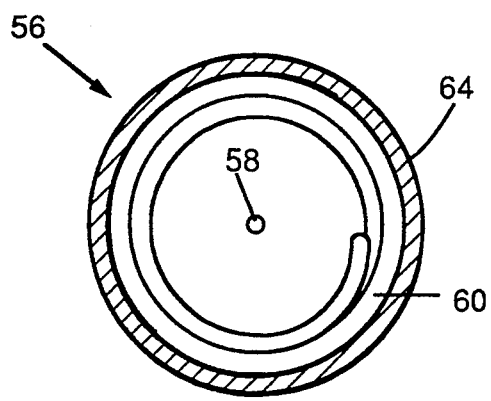

A modified form of thermocouple-heater assembly 34 is depicted in FIGS. 4 and 5, and is denoted by indicium 56. In this embodiment, a thermocouple 58 is centered within a heater coil 60, and the two are solidly affixed to one another by a ceramic encapsulating body 62, so as to space the heater coil from the thermocouple by encapsulating both the heater coil and the thermocouple, as shown. The total is held within a casing 64, such as of alumina.

Heater coil 60 is simply constructed as coil 40 of FIG. 3. Both comprise a nickel-chromium wire having a helically coiled portion 66 extending from a first lead 68, and extending to a second lead 70. Both leads 68 and 70 extend to a power supply, such as power supply 52 shown in FIG. 3. Portion 66 extends helically downwardly, and encircles thermocouple 58 and its wires 59. Portion 66 then terminates at a bottom portion 72, and rises in a generally straight line within coiled portion 66 for exit to the power supply.

In operation, prior to commencing purification, and with reference to FIG. 1, assembly 34 is positioned in the molten scrap aluminum which, at this point of the process, constitutes the composition of molten matter 29. Power supply 52 is energized to bring the temperature of heater coil 40 or 60 to a temperature which is greater than that of molten matter 29 and molten salt 30, to insure that heat moves from assembly 34 into the molten liquids. Upon supply of power to electrodes 16 and 18, magnesium is refined from the scrap aluminum and floats above molten salt 30 to its position identified by numeral 32. After a period of time, the molten scrap aluminum is converted into purified aluminum, which then constitutes the composition of molten matter 29. After the electrochemical refining process is completed, and when it is desired to draw the purified aluminum from refining zone 12, tap hole 26 is opened, to permit the purified aluminum to be collected in a collection vessel. During this draining, the levels of aluminum layer 29, molten electrolytic salt layer 30 and molten magnesium layer 32 drop until interface 28 between the aluminum and electrolyte layers passes below tip 36 of thermocouple-heater assembly 34. Because thermocouple 38 or 58 is at tip 36, the steady state temperature of the thermocouple will change as the rate of heat transfer into respective molten electrolyte 30 and molten aluminum 29 changes. Because the molten salt has a coefficient of thermal conductivity which is different from that of the molten aluminum and because aluminum is a better conductor of heat than the salt, heat transfer is at a greater rate into the molten aluminum than into the molten salt. These differences in the rates of temperature transfer are reflected in the steady state temperature of the thermocouple, and are displayed in temperature display 48, to denote the passage of interface 28 past the thermocouple, at the point slightly above the level of hole 26. Accordingly, outlet 26 is closed so that no further aluminum will be permitted to be drawn therethrough, and thereby to prevent contamination of previously drawn aluminum from furnace 10.

Figure 6:
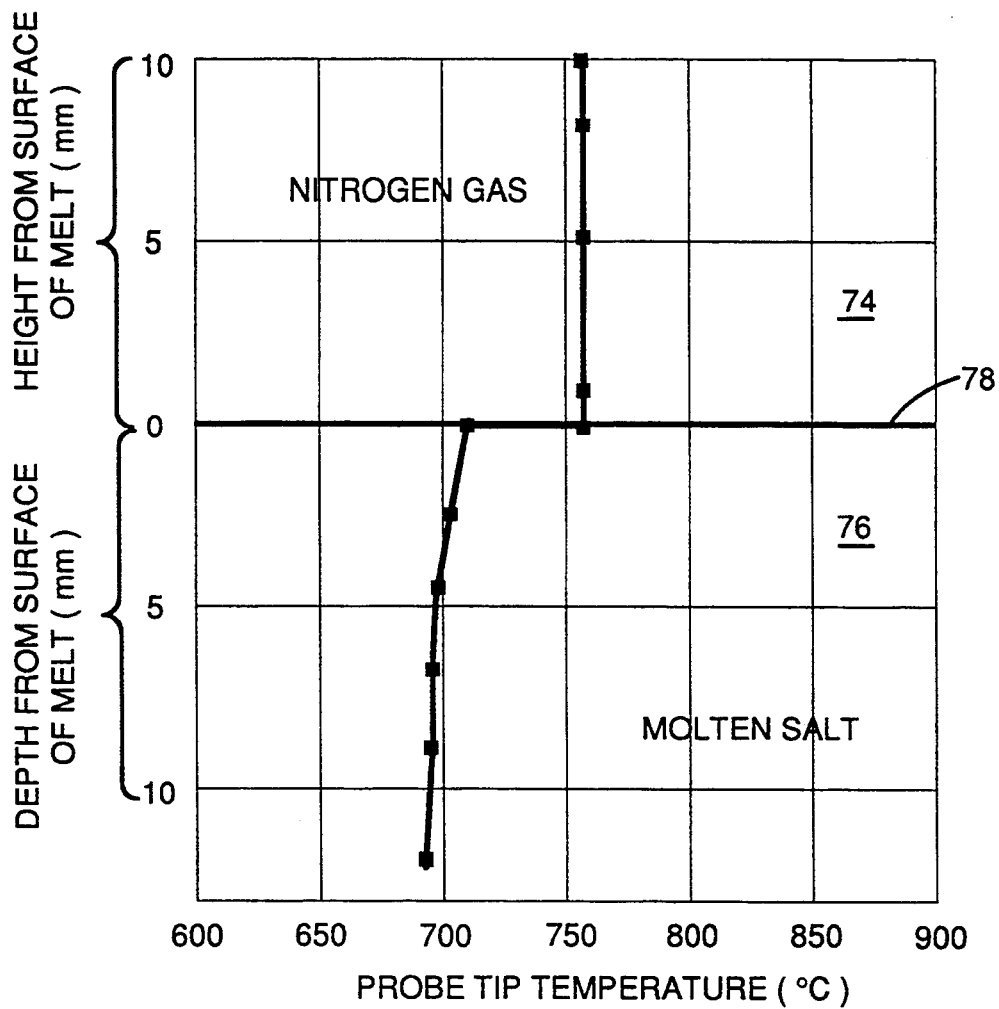
FIG. 6 graphically depicts data derived from an experiment in which the depth of the thermocouple within a gas and a melt, which are at the same temperature, is plotted against the temperature taken at the tip of the thermocouple.
Figure 7:
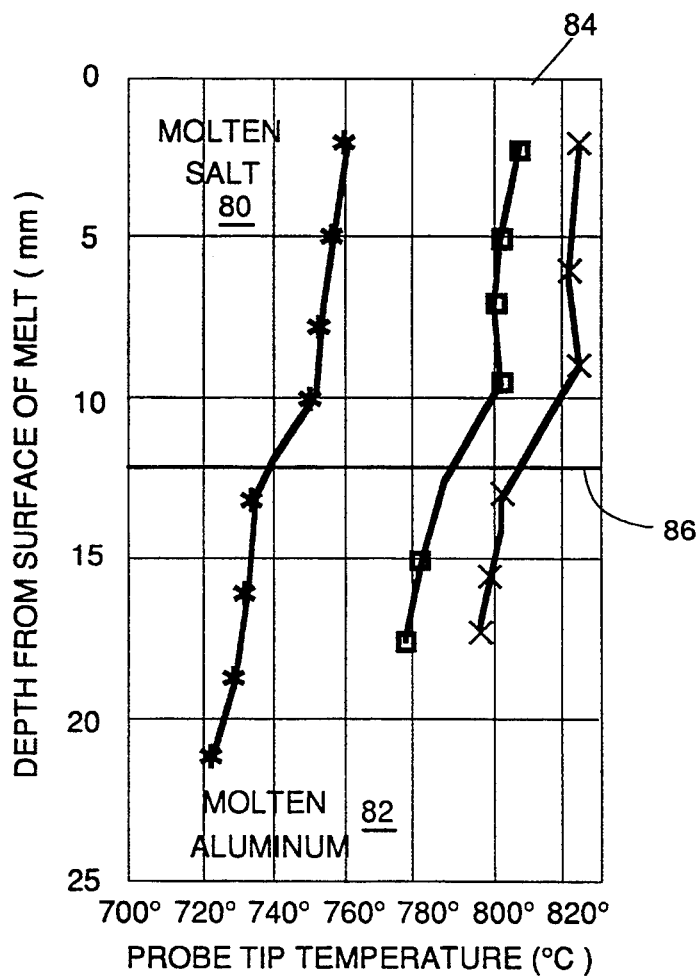
FIG. 7 graphically depicts data derived from an experiment in which the depth of the thermocouple from and within the melt is plotted against the temperature taken at the tip of the thermocouple.

FIGS. 6 and 7 depict the results of experimental uses of the present invention, in which all fluids, whether gaseous or liquid, are at the same temperature. FIG. 6 illustrates data taken from an experiment where the fluids respectively comprise a gas, specifically nitrogen 74, and a liquid, specifically a molten salt 76 having a gas-liquid interface 78. FIG. 7 shows data comprising three tests in a liquid-liquid environment comprising a molten salt 80 and molten aluminum 82. A surface 84 is between the molten salt and a gas, and a molten liquid-liquid interface 86 is between melts 80 and 82. The three tests are represented by the three sets of points forming three curves. The vertical axes in the graphical representations for the FIG. 6 and the FIG. 7 tests represent the depth of the thermocouple junction in the gas or below the surface of the molten materials. In FIG. 7, the precise location of the aluminum-salt interface was 12 millimeters below the surface of the melt, as indicated by line 86 of FIG. 7. The horizontal axes represent the equilibrium temperature of the thermocouple junction.

In the experiments, particularly with respect to FIG. 7, the depths of the salt and the aluminum layers used were not great and, therefore, the sensing device was not completely submerged in either melt at any time during the experiment, and also a portion extended into the inert gas atmosphere above the melts. Accordingly, heat lost through the sides of the sensing device changed when the device was lowered deeper into the melt. As a result, the temperature plot of FIG. 7 slopes on both sides of interface 86, due to the small depths of the aluminum and salt layers, and the exposure of a portion of the probe in the inert gas atmosphere. In practice, when the device is completely submerged in the molten materials, any slope should be eliminated, except for that portion which passes through the interface denoted by line 86 and which may not be linearly configured, as depicted, but be curved or stepped.

The data shown in FIGS. 6 and 7, therefore, clearly demonstrate a change in the equilibrium temperature when the sensing device passes through the fluid-fluid interface. This change in the equilibrium temperature provides the information necessary to define the precise location of the fluid-fluid interface.

Figure 8:
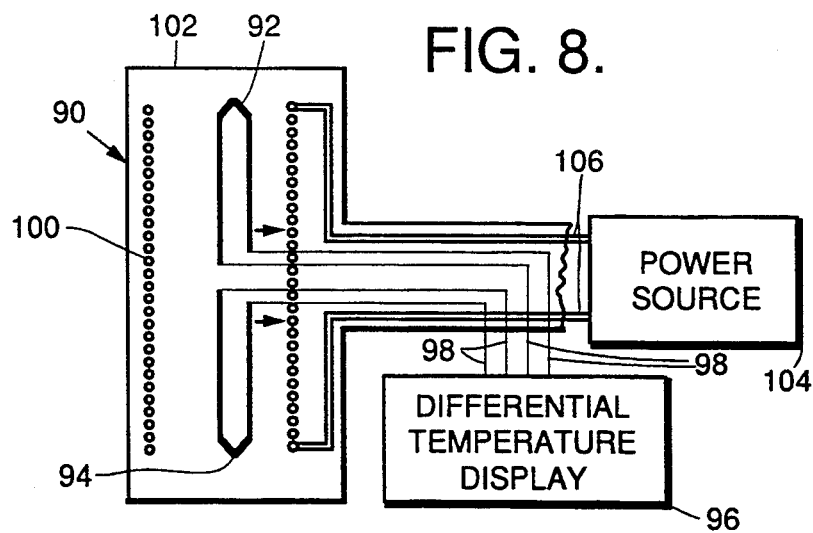
FIG. 8 illustrates another arrangement of the present invention utilizing a pair of oppositely facing thermocouples.

Referring now to FIG. 8, a modified thermocouple-heater assembly 90 includes a pair of thermocouples 92 and 94 which point oppositely from one another. Thermocouples 92 and 94 are coupled to a differential temperature display 96 by electrical leads 98. A single heater coil 100 is placed about both thermocouples within a suitably enclosed container 102 and suitably mounted therein such as by a ceramic cement. Heater coil 100 is energized from a power source 104 through electrical leads 106. This embodiment enables sensing to be obtained in a pair of adjacent molten liquids, and permits an expected more precise determination of an interface between the two liquids.

Figure 9:
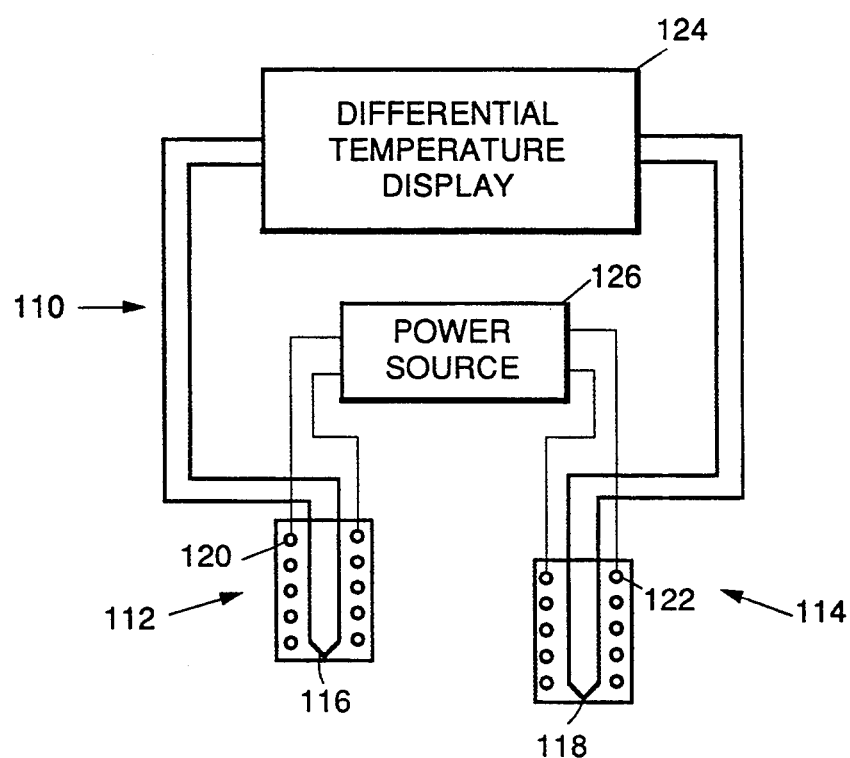
FIG. 9 shows a further arrangement of the present invention using a pair of temperature sensors whose tips are placed at different vertical levels so that they can be positioned in the two liquid layers or in the gas and the liquid layers on either side of the respective interfaces, to detect the different temperatures and, therefore, the existence and position of the interface.

FIG. 9 shows still a further embodiment of an arrangement 110 comprising a pair of temperature sensor-heater assemblies 112 and 114 having tips 116 and 118 which extend downwardly in their furnace, such as in furnace 10 of FIG. 1 towards its bottom 37. Heaters 120 and 122, as in the prior embodiments, are positioned about the tips. Suitable temperature sensors, such as thermocouple junctions, are positioned at respective tips 116 and 118. Assemblies are secured together in any suitable manner. Depending upon the stage at which the process is being conducted, tips 116 and 118 are positioned within refining zone 12 in molten matter 29, or are disposed about interface 28 after liquid aluminum has been drawn from furnace 10. Assemblies 112 and 114 terminate at levels which are respectively generally level with tap hole 26 and where tap hole 25 would have been, if retained, so that tip 116 is at a level which is slightly higher than that of tip 118. Connections for the temperature sensors at the tips and for heaters 120 and 122 extend upwardly to and from the top of furnace 10 where they terminate respectively in a differential temperature display 124 and a power supply 126.

Although the invention has been described with respect to particular embodiments thereof, it should be realized that various changes and modifications may be made therein without departing from the scope of the invention.

What is claimed is:

1. In an electrochemical process for extracting magnesium from scrap aluminum in which the scrap aluminum in molten form is coupled to an anode and an electrolyte in molten form is coupled to a cathode, and in which a top layer of molten magnesium and a bottom layer of molten aluminum, sandwiching an intermediate layer of the molten electrolyte, are formed from the scrap aluminum, said aluminum, said electrolyte and said magnesium comprising molten layers, wherein the improvement comprises a method for monitoring the level of any of the molten layers at their interfaces, comprising the steps of:

(a) providing a heat sensing device for sensing the position of said interfaces comprising (1) a thermocouple having a thermocouple junction and means coupled to said thermocouple for perceiving any change in the thermocouple temperature;

(2) a heater for heating said thermocouple junction to a temperature which is higher than those of the molten layers, (3) a tube for containing said thermocouple and said heater apart from said molten layers, said tube comprising a non-electrically conducting material, and (4) means for moving said heat sensing device or one of said molten layer interfaces relative to each other;

(b) moving one of said interfaces or the heat sensing device relative to each other;

(c) heating said heat sensing device to a temperature which is greater than those of the molten layers to ensure transfer of heat from the heat sensing device into the respective molten layers;

(d) measuring heat transfer as said heat sensing device passes from one molten layer to another through the interface therebetween;

(e) sensing a difference in heat transfer of the molten layers on either side of the interface; and (f) determining from said difference in heat transfer the position of said interface.

2. A method according to claim 1 further comprising the step of moving the interface with respect to the heat sensing device.

3. Apparatus for detecting the position of an interface between fluids respectively having different heat transfer characteristics, comprising a sensor for sensing a change in the heat transfer between said sensor and said fluids at said interface, said fluids comprising a bottom layer of molten aluminum, an intermediate layer of molten electrolyte, and a top layer of molten magnesium, said fluids maintained in an electrolytic cell provided with a first outlet for drawing off molten magnesium and a second outlet for drawing off molten aluminum, said sensor comprising:

(a) a first thermocouple having a first thermocouple junction and first means coupled to said first thermocouple for perceiving any change in the temperature of said first thermocouple;

(b) a heater for heating said thermocouple junction to a temperature which is higher than those of the fluids;

(c) a tube for containing said thermocouple and said heater apart from said fluids, said tube comprising a non-electrically conducting material; and (d) means for moving said sensor and said interface relative to each other.

4. Apparatus according to claim 3 further comprising a temperature display coupled to said thermocouple.

5. Apparatus according to claim 3 wherein said heater comprises a coil surrounding said thermocouple.

6. Apparatus according to claim 5 further comprising means for spacing said heater coil from said thermocouple.

7. Apparatus according to claim 6 in which said spacing means comprises means encapsulating both said heater coil and said thermocouple.

8. Apparatus according to claim 3 further comprising a second thermocouple having a second thermocouple junction and second means coupled to said second thermocouple for perceiving any change in the temperature of said second thermocouple wherein said first and second thermocouples form a pair of oppositely pointing thermocouples which define a region therebetween, said thermocouples capable of sensing movement of said interface through said region.

9. Apparatus according to claim 3 further comprising a second thermocouple having a second thermocouple junction and second means coupled to said second thermocouple for perceiving any change in the temperature of said second thermocouple wherein said first and second thermocouples form a pair of spaced apart thermocouples which define a region therebetween, said thermocouples capable of sensing movement of said interface through said region.

* * * * *